US008696348B2

(12) United States Patent
Cao et al.

(10) Patent No.: US 8,696,348 B2
(45) Date of Patent: Apr. 15, 2014

(54) ULTRA-LOW $NO_x$ BURNER ASSEMBLY

(75) Inventors: Jin Cao, Allentown, PA (US);
Mahendra Ladharam Joshi, Allentown, PA (US); Aleksandar Georgi Slavejkov, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1815 days.

(21) Appl. No.: 11/412,006

(22) Filed: Apr. 26, 2006

(65) Prior Publication Data
US 2007/0254251 A1 Nov. 1, 2007

(51) Int. Cl.
F23C 5/00 (2006.01)

(52) U.S. Cl.
USPC ............ 431/8; 431/10; 431/187; 431/353; 239/423; 239/424

(58) Field of Classification Search
USPC .............. 431/8, 10, 187, 9, 181, 350, 353; 239/423, 424
See application file for complete search history.

(56) References Cited

U.S. PATENT DOCUMENTS

| 4,494,923 | A | * | 1/1985 | Guillaume et al. ............... 431/9 |
| 4,595,353 | A | * | 6/1986 | de Haan ......................... 431/263 |
| 4,622,007 | A | | 11/1986 | Gitman |
| 4,642,047 | A | | 2/1987 | Gitman |
| 4,797,087 | A | * | 1/1989 | Gitman ............................ 431/10 |
| 4,907,961 | A | * | 3/1990 | Anderson ......................... 431/8 |
| 4,927,357 | A | | 5/1990 | Yap |
| 4,945,841 | A | | 8/1990 | Nakamachi et al. |
| 4,969,814 | A | * | 11/1990 | Ho et al. ........................... 431/8 |
| 4,983,118 | A | | 1/1991 | Hovis et al. |
| 5,545,033 | A | * | 8/1996 | Dick et al. ..................... 431/181 |
| 5,611,683 | A | * | 3/1997 | Baukal et al. .................... 431/10 |
| 5,743,723 | A | * | 4/1998 | Iatrides et al. .................... 431/8 |

(Continued)

FOREIGN PATENT DOCUMENTS

| EP | 0 762 050 A2 | 3/1997 |
| EP | 1 205 710 A1 | 5/2002 |

(Continued)

OTHER PUBLICATIONS

Milani, Dr. Ing Ambrogio, Diluted Combustion Technologies, IFRF Combustion Journal, Feb. 2001, Article No. 200101, pp. 1-32.

(Continued)

*Primary Examiner* — Avinash Savani
(74) *Attorney, Agent, or Firm* — Anne B. Kiernan; Michael K. Boyer; Larry S. Zelson

(57) ABSTRACT

Burner assembly comprising (a) an elongated body having a periphery, a discharge end adjacent a combustion zone, and an axis, wherein the axis extends into the combustion zone; (b) one or more oxidant nozzles disposed at the discharge end of the elongated body and adapted to discharge a gaseous oxidant into the combustion zone; and (c) one or more fuel nozzles disposed at the discharge end of the elongated body and adapted to discharge a fuel into the combustion zone. At least one of the oxidant and fuel nozzles is characterized by a shape factor, σ, that is greater than about 10, wherein σ is a dimensionless parameter defined as $\sigma = P^2/2A$ where P is the perimeter dimension of the discharge opening and A is the area of the discharge opening.

30 Claims, 14 Drawing Sheets

(56) References Cited

U.S. PATENT DOCUMENTS

| | | | |
|---|---|---|---|
| 6,062,495 A * | 5/2000 | Ushioda et al. | 239/424.5 |
| 6,125,133 A | 9/2000 | Mathur et al. | |
| 6,474,982 B2 * | 11/2002 | Satchell et al. | 432/19 |
| 6,752,620 B2 * | 6/2004 | Heier et al. | 431/8 |
| 6,773,256 B2 | 8/2004 | Joshi et al. | |
| 6,866,503 B2 | 3/2005 | Ladharam | |
| 6,926,516 B1 | 8/2005 | Sudo | |
| 2004/0195402 A1 | 10/2004 | Joshi | |
| 2005/0239005 A1 * | 10/2005 | Lugnet et al. | 431/8 |

FOREIGN PATENT DOCUMENTS

| | | |
|---|---|---|
| EP | 1 443 271 A1 | 8/2004 |
| EP | 1 612 481 A2 | 1/2006 |
| EP | 1 612 484 A1 | 1/2006 |
| RU | 2 186 294 C2 | 7/2002 |

OTHER PUBLICATIONS

Baukal, C.E., Oxygen Enhanced Combustion, CRC Press LLC, 1998, pp. 45-73, Boca Raton.

* cited by examiner

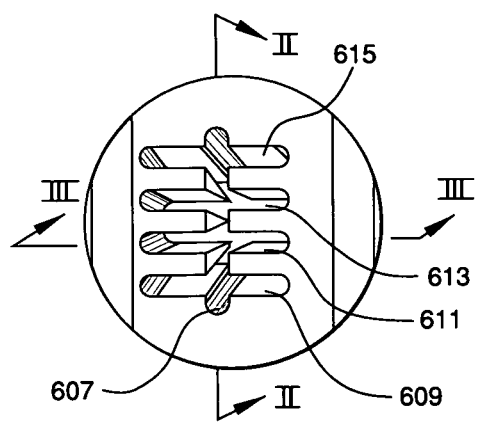
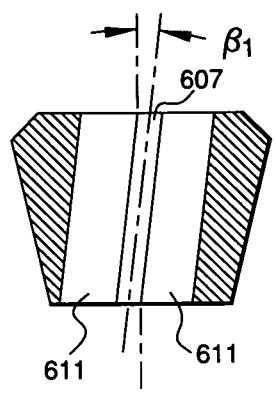
FIG. 8A          FIG. 8C
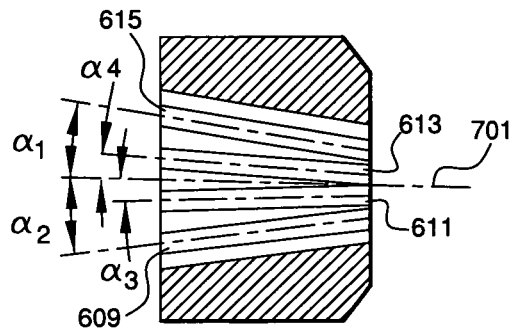
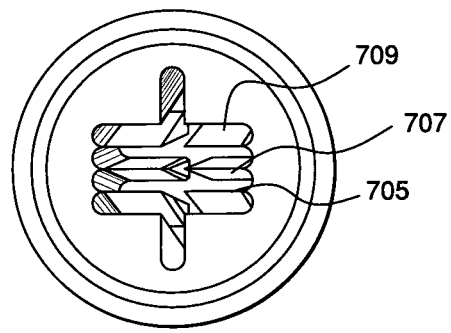
FIG. 8B          FIG. 8D

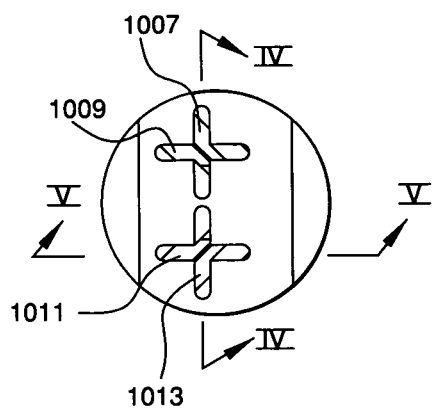
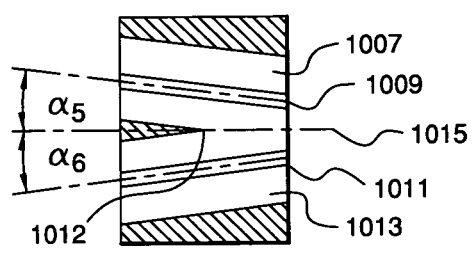
FIG. 10A  FIG. 10B
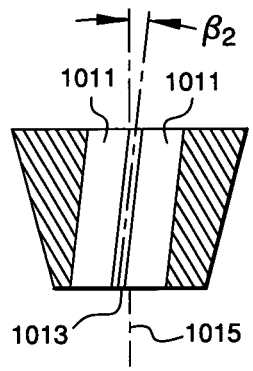
FIG. 10C

ULTRA-LOW $NO_x$ BURNER ASSEMBLY

BACKGROUND OF THE INVENTION

Nitrogen oxides (NOx) are among the primary air pollutants emitted by combustion processes. Because nitrogen oxides promote the formation of harmful atmospheric reaction products that cause smog, air quality standards have been imposed by various government agencies to limit the amount of NOx that can be emitted into the atmosphere. As a result of the increasing environmental legislation in many countries and increasing global awareness of atmospheric pollution, modern combustion technology has been improved to curb NOx emissions from many types of combustion equipment. Most of the efforts to date have focused on the reduction of thermal NOx, which contributes the largest portion of NOx formed by combustion. Many of the conventional NOx reduction techniques such as staging suppress thermal NOx formation but are not effective against prompt NOx. Advances in combustion technology are needed to control the generation of both thermal NOx and prompt NOx to reduce total NOx emission levels to below 10 ppmv with air fuel firing.

The secondary metals industry is generally considered to be a major source of NOx pollution and therefore is subject to stringent regulations on NOx emissions. The reduction of NOx production in combustion processes becomes more important in this industry as the demand for metals increases while environmental regulations on NOx become increasingly stringent. Full oxy-fuel combustion theoretically can produce very low NOx emissions due to the lack of nitrogen in the oxidant. However, certain industrial processes such as secondary aluminum melting are susceptible to large amounts of air ingress into furnaces in which the extremely high flame temperatures of an oxy-fuel flame increase thermal NOx formation. The steel industry also is facing similar challenges in the control of NOx emissions, and processes such as steel reheating and ladle preheating are large NOx generators due to air leakage into the process furnaces.

Air-fuel combustion is notoriously inefficient without heat recovery methods. Using oxygen or oxygen-enriched air in place of air for combustion increases the flame temperature and thus the radiative heat transfer to the load, and also greatly increases the amount of available process heat from the combustion process by eliminating the wasteful heating of the nitrogen in air. Air-fuel firing with heat recovery, the best example of which uses regenerative burners, is an alternative to oxy-fuel firing. In a common configuration, regenerative burners are installed in pairs in a furnace such that one burner fires while the other burner serves as an exhaust conduit through which the flue gas exits the furnace and flows through a bed of heat storage material. At preset intervals, the two burners switch roles, and the combustion air is preheated by flowing over the regenerative bed. Most of these regenerative air-fuel burners usually produce NOx emissions in the several hundred ppmv range.

A relatively new technique of NOx control is described in the art as flameless combustion wherein the reactants for combustion are highly diluted before they mix and react. The reactants usually are diluted by entraining combustion products before the combustion reactions occur. This mode of combustion typically occurs when the oxidizing gas is diluted to a level below 17% oxygen, wherein the flame front disappears and the fuel oxidizes in a flameless fashion. The key to this technology is the maintenance of the furnace temperature above the auto-ignition temperature of the fuel and the use of a highly-robust flame stabilizer.

There is a need in the process industries, and particularly in the secondary metals industries, for improved combustion technology that reduces NOx formation and optimizes energy consumption. Improvements to flameless combustion processes are needed for burners that can fire in various modes using various oxidants including air, enriched air, pure oxygen, and/or combinations thereof while achieving low NOx production during all modes of operation. There also is a need for improved flameless combustion processes that effect uniform heat distribution to the raw metal charge in melting furnaces.

These needs are addressed by the embodiments of the present invention as described below and defined by the claims that follow.

BRIEF SUMMARY OF THE INVENTION

One embodiment of the invention relates to a burner assembly comprising (a) an elongated body having a periphery, a discharge end adjacent a combustion zone, and an axis, wherein the axis extends into the combustion zone; (b) one or more oxidant nozzles disposed at the discharge end of the elongated body and adapted to discharge a gaseous oxidant into the combustion zone; and (c) one or more fuel nozzles disposed at the discharge end of the elongated body and adapted to discharge a fuel into the combustion zone. At least one of the oxidant and fuel nozzles is characterized by a shape factor, $\sigma$, that is greater than about 10, wherein $\sigma$ is a dimensionless parameter defined as $\sigma = P^2/2A$ where P is the perimeter dimension of the discharge opening and A is the area of the discharge opening.

At least one of the one or more fuel nozzles and at least one of the one or more oxidant nozzles may be located at equal radial distances from the axis. All of the one or more fuel nozzles and all of the one or more oxidant nozzles may be located at equal radial distances from the axis. At least one of the one or more fuel nozzles may be disposed between two oxidant nozzles.

At least one of the one or more fuel nozzles may be located at a radial distance from the axis that is greater than the radial distance from the axis of at least one of the one or more oxidant nozzles. All of the one or more fuel nozzles may be located at radial distances from the axis that are greater than the radial distances from the axis of all of the one or more oxidant nozzles.

At least one of the one or more oxidant nozzles may be located at a radial distance from the axis that is greater than the radial distance from the axis of at least one of the one or more fuel nozzles. All of the oxidant nozzles may be located at radial distances from the axis that are greater than the radial distances of all of the fuel nozzles from the axis.

The elongated body of the burner assembly may be divided by a horizontal plane containing the axis of the elongated body, wherein the number of oxidant nozzles disposed above the plane is greater than the number of oxidant nozzles disposed below the plane, and wherein the number of fuel nozzles disposed below the plane is greater than the number of fuel nozzles disposed above the plane. All of the oxidant nozzles may be disposed above the plane and all fuel nozzles are disposed below the plane.

Alternatively, the elongated body burner assembly may be divided by a horizontal plane containing the axis of the elongated body, wherein the number of oxidant nozzles disposed below the plane is greater than the number of oxidant nozzles disposed above the plane, and wherein the number of fuel nozzles disposed above the plane is greater than the number of fuel nozzles disposed below the plane.

The burner assembly may include at least one flame stabilizer disposed within the periphery of the elongated body. The flame stabilizer may be adapted to combust a flame stabilizer fuel with one or more oxidizing gases to form combustion products and to discharge the combustion products into the combustion zone. The flame stabilizer may be characterized by a flame stabilizer axis, wherein the flame stabilizer axis is coaxial with the axis of the elongated body.

The burner assembly may include a passage disposed within the periphery of the elongated body and in flow communication with the combustion zone, wherein the passage is adapted to introduce an oxygen-containing gas into the combustion zone and to withdraw combustion products from the combustion zone. The passage may be characterized by an axis that is parallel to or coincident with the axis of the elongated zone, and wherein the one or more fuel and one or more oxidant nozzles are spaced apart from the passage and disposed around the passage. The burner assembly may include a flame stabilizer disposed within the passage that is characterized by an axis that is parallel to or coincident with the axis of the passage. The burner assembly may include a flame stabilizer disposed between the passage and the periphery of the elongated body.

The burner assembly may include an auxiliary burner disposed within the periphery of the elongated body and adapted to combust a fuel with an oxygen-containing gas having a composition in the range of 20.9 vol % to greater than 99.5 vol % oxygen and to discharge combustion products therefrom into the combustion zone. The auxiliary burner may be disposed at a radial distance from the axis of the elongated body that is less than the radial distance or distances of the one or more fuel and oxidant nozzles from the axis.

In the burner assembly, at least one of the one or more fuel nozzles may be adapted to discharge fuel in a direction that intersects a plane containing the axis of the elongated body at an included angle of up to 45 degrees. Alternatively or additionally, at least one of the one or more fuel nozzles may be adapted to discharge fuel in a direction that diverges from a plane containing the axis of the elongated body at an included angle of up to 45 degrees.

At least one of the one or more oxidant nozzles may be adapted to discharge the gaseous oxidant in a direction that intersects a plane containing the axis of the elongated body at an included angle of up to 45 degrees. Alternatively or additionally, at least one of the one or more oxidant nozzles may be adapted to discharge the gaseous oxidant in a direction that diverges from a plane containing the axis of the elongated body at an included angle of up to 45 degrees.

Another embodiment of the invention includes a burner assembly comprising (a) an elongated body having a periphery, a discharge end adjacent a combustion zone, and an axis, wherein the axis extends into the combustion zone; (b) one or more fuel nozzles disposed at the discharge end of the elongated body and adapted to discharge a fuel into the combustion zone; and (c) an auxiliary burner disposed within the elongated body and adapted to combust a fuel with an oxygen-containing gas having a composition in the range of 20.9 vol % to greater than 99.5 vol % oxygen and to discharge combustion products therefrom into the combustion zone. At least one of the fuel nozzles is characterized by a shape factor, $\sigma$, that is greater than about 10, wherein $\sigma$ is a dimensionless parameter defined as $\sigma=P^2/2A$ where P is the perimeter dimension of the discharge opening and A is the area of the discharge opening.

The auxiliary burner may be disposed at a radial distance from the axis of the elongated body that is less than the radial distance or distances of the one or more fuel nozzles from the axis.

An alternative embodiment of the invention relates to a combustion method comprising (a) providing a burner assembly including (1) an elongated body having a periphery, a discharge end adjacent a combustion zone, and an axis, wherein the axis extends into the combustion zone, (2) one or more oxidant nozzles disposed at the discharge end of the elongated body and adapted to discharge a gaseous oxidant into the combustion zone, and (3) one or more fuel nozzles disposed at the discharge end of the elongated body and adapted to discharge a fuel into the combustion zone, wherein at least one of the oxidant and fuel nozzles is characterized by a shape factor, $\sigma$, that is greater than about 10, wherein $\sigma$ is a dimensionless parameter defined as $\sigma=P^2/2A$ where P is the perimeter dimension of the discharge opening and A is the area of the discharge opening;

(b) discharging the gaseous oxidant through the one or more oxidant nozzles into the combustion zone; and (c) discharging the fuel through the one or more fuel nozzles into the combustion zone and combusting the fuel with gaseous oxidant in the combustion zone.

The gaseous oxidant may contain greater than 20.9 vol % oxygen. The fuel may be discharged through at least one of one or more fuel nozzles in a direction that intersects a plane containing the axis of the elongated body. Alternatively or additionally, the fuel may be discharged through at least one of the one or more fuel nozzles in a direction that does not intersect a plane containing the axis of the elongated body.

The combustion method may further comprise providing at least one flame stabilizer disposed within the periphery of the elongated body, wherein the flame stabilizer is adapted to combust a flame stabilizer fuel with one or more oxidizing gases to form combustion products and to discharge the combustion products into the combustion zone, combusting the flame stabilizer fuel with one or more oxidizing gases to form combustion products, and discharging the combustion products into the combustion zone. The concentration of oxygen in the gaseous oxidant may be greater than the concentration of oxygen in the one or more oxidizing gases.

Another alternative embodiment of the invention includes a combustion method comprising (a) providing a burner assembly including (1) an elongated body having a periphery, a discharge end adjacent a combustion zone, and an axis, wherein the axis extends into the combustion zone, (2) one or more oxidant nozzles disposed at the discharge end of the elongated body and adapted to discharge a gaseous oxidant into the combustion zone, (3) one or more fuel nozzles disposed at the discharge end of the elongated body and adapted to discharge a fuel into the combustion zone, and (4) a passage disposed within the periphery of the elongated body and in flow communication with the combustion zone, wherein the passage is adapted to introduce an oxygen-containing gas into the combustion zone and to withdraw combustion products from the combustion zone, wherein at least one of the oxidant and fuel nozzles is characterized by a shape factor, $\sigma$, that is greater than about 10, wherein $\sigma$ is a dimensionless parameter defined as $\sigma=P^2/2A$ where P is the perimeter dimension of the discharge opening and A is the area of the discharge opening;

(b) during a first time period, introducing the oxygen-containing gas through the passage into the combustion zone, introducing the gaseous oxidant through the one or more oxidant nozzles into the combustion zone, introducing the fuel through the one or more fuel nozzles into the combustion zone, and combusting the fuel to generate combustion products in the combustion zone; and (c) during a second time period, terminating the introduction into the combustion zone of the oxygen-containing gas, the gaseous oxidant, and the fuel, and withdrawing at least a portion of the combustion products from the combustion zone through the passage.

The concentration of oxygen in the gaseous oxidant in this embodiment may be greater than the concentration of oxygen in the oxygen-containing gas.

BRIEF DESCRIPTION OF SEVERAL VIEWS OF THE DRAWINGS

FIG. 8A is a front view of the nozzle body of FIG. 6 showing the discharge end or nozzle of the nozzle body.

FIG. 8B is a view of section II-II of FIG. 8A.

FIG. 8C is a view of section III-III of FIG. 8A.

FIG. 8D is a rear view of the nozzle body of FIG. 6 showing the inlet end of the nozzle body.

FIG. 10A is a front view of the nozzle body of FIG. 9 showing the discharge end or nozzle of the nozzle body.

FIG. 10B is a view of section IV-IV of FIG. 8A.

FIG. 10C is a view of section V-V of FIG. 8A.

DETAILED DESCRIPTION OF THE INVENTION

Figure 1:
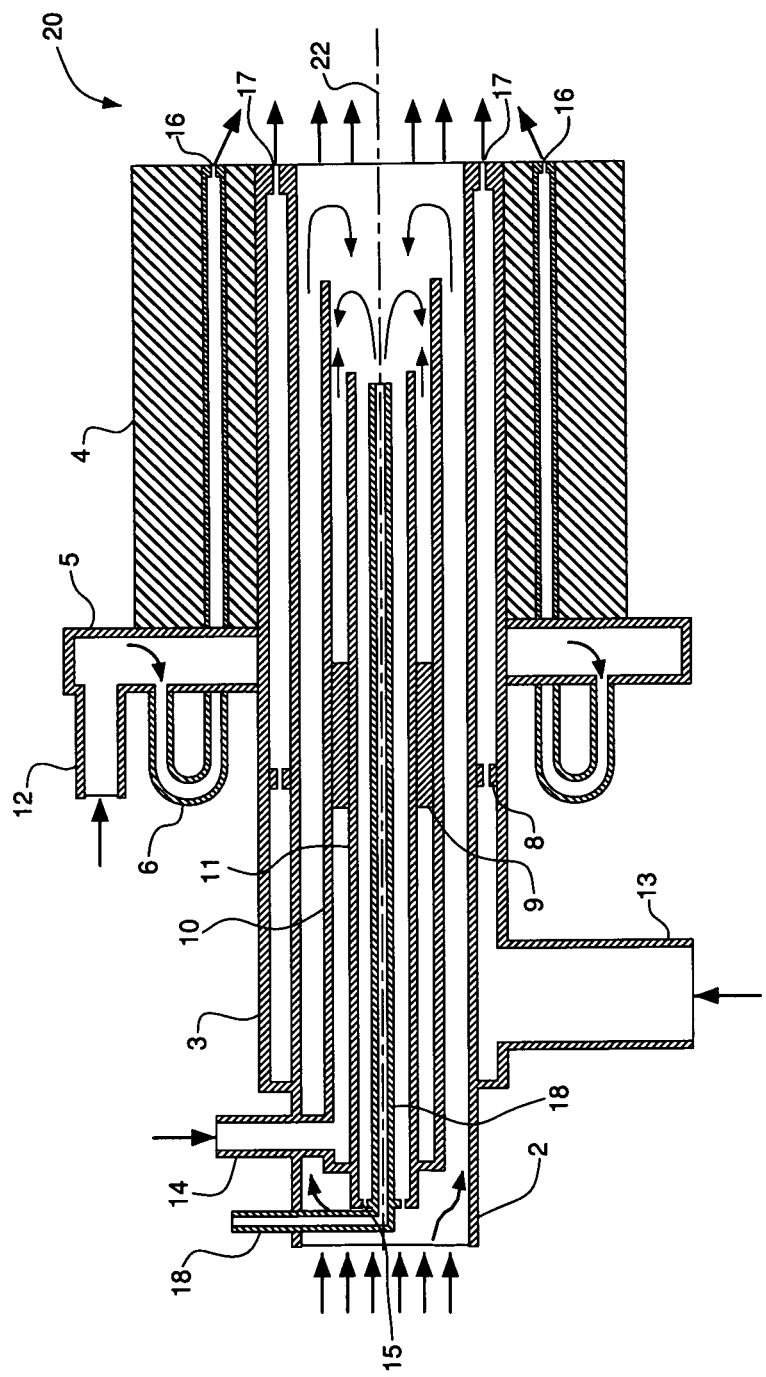
FIG. 1 is an axial section of a burner assembly according to an embodiment of the invention.

Embodiments of the invention relate to ultra-low NOx burners capable of operating with various oxygen-containing gases having oxygen concentrations ranging from 20.9 vol % (air) to greater than 99.5 vol % (high purity oxygen). In one embodiment, a burner assembly is provided for continuous combustion operation having a central flame stabilizer surrounded by multiple nozzles for injecting individual streams of fuel and gaseous oxidant into the furnace or combustion zone. The fuel nozzles typically are located at radial distances from the flame stabilizer axis that are equal to or greater than radial distances of the gaseous oxidant nozzles from the flame stabilizer axis. The gaseous oxidant injected through the nozzles may contain greater than 65 vol % oxygen. The central flame stabilizer combusts fuel with one or more oxidizing gases selected from air, oxygen-enriched air, high purity oxygen, or combinations thereof. The burner assembly may be operated without central flame stabilizer, wherein all combustion is provided by the gaseous oxidant and fuel streams introduced via the nozzles.

In another embodiment, a burner assembly is provided for use in regenerative combustion wherein the burner has a central conduit for introducing an oxygen-containing gas (for example, air) into a furnace or combustion zone during a combustion phase and for withdrawing combustion products from the furnace during an exhaust phase. A pair of burners may be operated in alternating fashion with one firing in the combustion phase and the other withdrawing combustion products in the exhaust phase. Fuel and gaseous oxidant are introduced individually through multiple nozzles surrounding the central conduit during the combustion phase, and at least one flame stabilizer may be provided either inside or outside of the central conduit. The fuel nozzles typically are located at radial distances from the central conduit axis that are equal to or greater than radial distances of the oxidant nozzles from the central conduit axis. The gaseous oxidant injected through the nozzles may contain greater than 65 vol % oxygen. Each flame stabilizer combusts fuel with one or more oxygen-containing gases selected from air, oxygen-enriched air, high purity oxygen, or combinations thereof.

The burner assemblies described herein produce low NOx levels by using a spaceous or distributed combustion process stabilized by flame stabilizers to deliver uniform heating to the load in the furnace or combustion zone. Spaceous or distributed combustion, also described in the art as flameless combustion, occurs when the fuel and oxidizer are rapidly diluted prior to reacting in the furnace. The burner assemblies may be operated in various heating modes to satisfy various process requirements in the furnace. In one mode, the highest radiative heat transfer and largest amount of available heat are provided by using oxygen concentrations up to values greater than 99.5 vol % in the gaseous oxidant injected by the oxidant nozzles, in the oxidizing gas(es) to the flame stabilizers, and/or in the central conduit. In another mode, an optimum combination of convective and radiative heat transfer is provided by operating the burners in an enriched air/fuel mode wherein the injected gaseous oxidant contains up to 65 vol % oxygen. In a third mode, cost-effective operation is provided when the process heat demand is low by using air/fuel combustion in which all gaseous oxidants and oxidizing gases are air. Operation may be switched among these three modes as needed to provide different heat transfer mechanisms and process heat requirements.

The fuel and gaseous oxidant injection nozzles may have discharge opening geometries as described below that produce a large degree of fluid entrainment whereby the injected fuel and oxidant streams are diluted with furnace combustion gases before the fuel and oxidant streams react. The nozzles are characterized by a shape factor, σ, that is greater than about 10, wherein σ is a dimensionless parameter defined as $$\sigma = P^2/2A$$

where P is the perimeter dimension of the discharge opening and A is the area of the discharge opening. The perimeter dimension is the dimension of the wetted edges of the discharge opening as measured at the plane of the nozzle face where the nozzle discharges into the combustion zone.

The embodiments of the invention may be utilized, for example, in industrial applications such as secondary aluminum melting, steel reheating, and ladle preheating. Secondary aluminum melters recycle scrap material by melting and recasting, which accounts for roughly 33% of all primary aluminum production in the United States. Energy savings are important to the industry, especially as energy costs have risen steadily in recent years. Process optimization and heat recovery can both lead to significant energy conservation. Although there are four or five different types of combustion furnaces for aluminum melting, the two most widely-used types are reverberatory (reverb) and rotary furnaces. The reverb furnace is a large tank with wall-fired burners wherein aluminum scrap is charged into the furnace, heated, and melted, and liquid aluminum is tapped from the furnace in a semi-continuous fashion. The rotary furnace is a refractory-lined metal cylinder rotating about its axis with the burner installed on the door at one end.

An aluminum melting process occurs in several stages including pile melt-down, bath superheating, and tapping. An initially-charged furnace is packed with a pile of scrap metal with free volume in the form of interstitial spaces. Due to the lack of "lines of sight" for flame radiation to reach all the metal surfaces in the pile, forced convection is the most efficient form of heat transfer in this step. Solid aluminum is a significant heat sink due to its very high thermal conductivity and heat capacity. Therefore, this stage requires a combustion process that provides combustion gases with a high flow momentum that can deliver heat deep into the scrap metal pile. These heating characteristics are best provided by an oxygen-enriched air-fuel burner wherein the gaseous oxidant contains 35 to 65 vol % oxygen.

Once much of the metal pile melts down into a molten bath, the radiation view factor in the furnace is much improved, and radiation is the preferred heat transfer mechanism to melt the remaining solids and to superheat the molten bath to the desired alloying and pouring temperature. Radiation to the bath is provided by the flame, the refractory, and the triatomic gases in the combustion products. Oxy-fuel combustion is a suitable choice for this stage to provide the highest possible flame temperature, which can be achieved using a gaseous oxidant containing from 65 vol % to greater than 99.5 vol % oxygen. Once all the solids have melted and the bath is superheated, liquid metal is tapped after an optional holding period. The heating requirement is low during these periods and heat is needed only to maintain the bath temperature. During this period, the most economical heating is provided by conventional air-fuel firing in which all gaseous oxidants and oxidizing gases are air.

The embodiments of the invention thus provide flexible burner assemblies that can be operated to provide the most efficient heat transfer during each of the process stages described above. While illustrated above for aluminum melting, these embodiments may be applied to other metals processes such as steel reheating and ladle preheating, and also may be applied in glass melting applications.

In the present specification, the terms "burner assembly" and "burner" are equivalent and define an apparatus of assembled parts for the combustion of a fuel with oxygen provided in an oxygen-containing gas. The term "combustion zone" is defined as an enclosed body such as a furnace in which combustion reactions occur, at least one of which may be the reaction of a carbon and/or hydrogen-containing fuel with oxygen to form carbon oxides and/or water and heat. An axial body is any elongated space geometrically defined by an axis and having one dimension defined in the axial direction and another dimension defined in a radial direction orthogonal to the axis. The dimension in the radial direction may be constant at any axial location (i.e., forming a cylinder) or may vary with axial location and/or angular location around the axis. The axial body is characterized by at least one end adjacent a combustion zone.

A flame stabilizer is defined as a device in a burner assembly that operates to anchor a flame to the burner assembly and to provide flame stability, thereby ensuring stable operation of the burner assembly. The flame stabilizer may operate continuously or intermittently.

One type of flame stabilizer is a combustion device for combusting a fuel with oxygen provided in one or more oxidizing gases, wherein the oxidizing gas flows through a portion of the flame stabilizer in an axial direction. At some point in the flame stabilizer, the direction of the oxidizing gas is changed at least 90 degrees from the axial direction before being contacted with and reacted with the fuel. The change in direction may be effected mechanically by a bluff body extending into the stream of oxidizing gas or by fluidic pressure differentials caused by velocity differences between multiple flowing oxidizing gas streams. A fluidic flame stabilizer or a mechanical flame stabilizer of this type discharges combustion products into a combustion zone.

Another type of flame stabilizer is an energetic device that introduces an amount of heat energy to the burner assembly to ensure flame stability. The energetic device may be, for example, an oxy-fuel burner or a pilot burner that combusts a premixed gas containing fuel and an oxygen-containing gas such as air. A pilot burner, which also may be defined as an auxiliary burner, is a small burner installed in close proximity to a main burner or burner assembly that produces a flame used to ignite the main burner or burner assembly. The auxiliary burner may stay lit throughout the operation or may be turned off once the main burner or burner assembly is lit. Alternatively, the flame stabilizer may be a non-combustion energetic device such as a spark igniter or a plasma generator.

A nozzle is a fluid injection device for the introduction of a primary fluid into a secondary fluid to promote the efficient mixing of the two fluids. The nozzle is defined by an opening through which the primary fluid is discharged into the secondary fluid. The nozzle may be attached to a hollow, typically cylindrical body that is connected to a pipe, manifold, or other type of passage for delivering the primary fluid to the nozzle. Alternatively, the nozzle may an integral part of a manifold wherein the opening that forms the nozzle is located directly in an outer wall of the manifold. Typically, the primary fluid undergoes a drop in pressure upon passing through the nozzle.

A gaseous oxidant is defined herein as an oxygen-containing gas discharged through a nozzle. An oxidizing gas is defined as an oxygen-containing gas utilized in a flame stabilizer. Typically, the oxygen concentration in a gaseous oxidant is greater than the oxygen concentration in an oxidizing gas. The term "oxygen-enriched" describes an oxygen-containing gas having an oxygen concentration greater than that of air. The term "oxy-fuel" refers to the combustion of a fuel with an oxygen-enriched gas.

A fuel comprises an element or compound which can be combusted with oxygen to form combustion products. The term "combustion products" means a gas mixture comprising any of the following: carbon oxides, water, unreacted fuel, unreacted oxygen, oxides of nitrogen, oxides of sulfur, and inert components from air including nitrogen and argon. Typically the fuel is a single-phase gas or liquid, but alternatively may be a flowable multi-phase fluid such as a two-phase mixture of a hydrocarbon liquid and a combustible gas, a suspension of water and a liquid hydrocarbon, a suspension of a solid carbonaceous fuel in air or water, or a suspension of a solid carbonaceous fuel in a liquid hydrocarbon.

The term "in flow communication with" as applied to a first and second body means that a fluid can flow from the first body to the second body and from the second body to the first body through connecting piping and/or an intermediate body. The term "connected to" as applied to a first and second body means that a fluid can flow from the first body to the second body and from the second body to the first body through connecting piping.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

A first embodiment of the invention is illustrated by the axial section of a burner assembly in FIG. 1. The burner assembly comprises central oxidizing gas conduit 2 surrounded by outer gaseous oxidant pipe 3. A fluid-based or fluidic flame stabilizer is situated inside central oxidizing gas conduit 2, wherein the flame stabilizer comprises fuel pipe 10 recessed inside oxidizing gas conduit 2 and secondary oxidizing gas pipe 11 recessed inside the fuel pipe 10. Inside the fuel pipe, swirl vanes 9 may be used to distribute and create a swirl in the fuel flow. At the upstream end of secondary oxidizing gas pipe 11, orifice 15 controls the amount of oxidizing gas flow flowing into secondary oxidizing gas pipe 11 relative to the amount flowing into central oxidizing gas conduit 2. The oxidizing gas may be air. Fuel lance 18 may be located in the center of the flame stabilizer and may be used for injecting fuel when starting up a cold furnace.

The flame stabilizer fuel is supplied via fuel inlet 14 to the annulus between pipes 10 and 11, and the fuel is combusted in the flame stabilizer with (1) the primary oxidizing gas flowing in the annulus between pipe 10 and central oxidizing gas conduit 2 and (2) the secondary oxidizing gas flowing in the annulus between pipes 11 and 18. The flame stabilizer fuel may be a gaseous fuel or a liquid fuel, for example, natural gas, ethane, propane, diesel oil, refinery fuel gas, hydrogen, or a combination thereof. The combustion products from the flame stabilizer discharge into combustion zone 20. The burner assembly and flame stabilizer are characterized by axis 22.

A gaseous oxidant enters oxygen inlet 13, flows through the annulus between central air conduit 2 and outer gaseous oxidant pipe 3, through optional flow distributor 8 (for example, a perforated plate), and is discharged through a plurality of oxidant nozzles 17 into combustion zone 20. The gaseous oxidant typically is oxygen-enriched and may contain a concentration greater than 20.9 vol % and up to greater than 99.5 vol % oxygen. The oxidant nozzles typically lie in the exit plane of central air conduit 2 orthogonal to the axis of the burner assembly.

Staging fuel is introduced via inlet pipe 12, is distributed radially by manifold 5, and flows through a plurality of staging fuel lances 6 to a plurality of staging fuel nozzles 16 at the end of the lances. The staging fuel may be directed at an inward angle towards the gaseous oxidant discharged from oxidant nozzles 17 and the combustion products from the flame stabilizer; in this arrangement, the flow direction of the staging fuel discharged from any of nozzles 16 intersects a plane containing axis 22 of the burner assembly. The included angle between the fuel flow direction and the plane containing axis 22 may be up to 45 degrees. Alternatively, the staging fuel may be directed at an outward angle away from the gaseous oxidant from oxidant nozzles 17 and the combustion products from the flame stabilizer; in this arrangement, the flow direction of the staging fuel discharged from any of nozzles 16 diverges from the plane containing axis 22 of the burner assembly by up to 45 degrees. The directions of fuel flow from the nozzles may vary among the nozzles in any desired combination.

The staging fuel may be a gaseous fuel or a liquid fuel, for example, natural gas, ethane, propane, diesel oil, refinery fuel gas, hydrogen, or a combination thereof. The staging fuel may be the same as or different than the flame stabilizer fuel.

Figure 2:
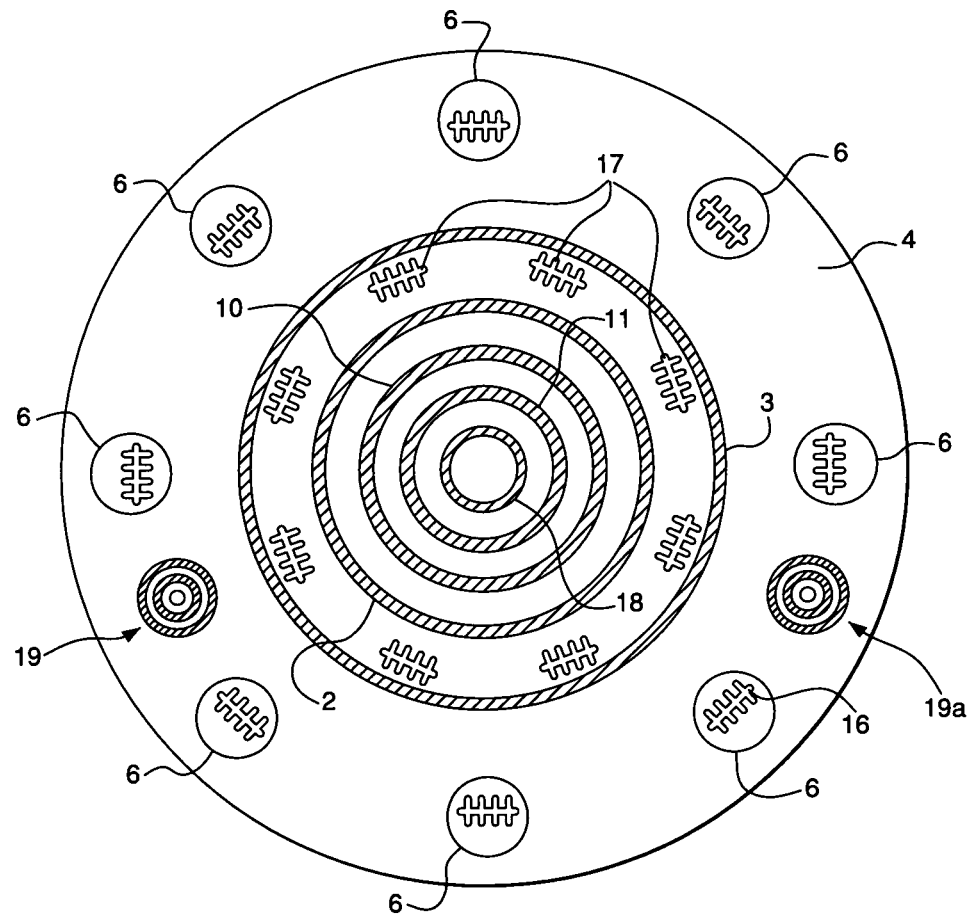
FIG. 2 is a front view of the embodiment of FIG. 1 showing the discharge end of the burner assembly.

An exemplary arrangement of the flame stabilizer and nozzles is illustrated in FIG. 2, which is a front view of FIG. 1 at the face of the burner assembly. The burner assembly is housed inside burner tile 4 and discharges into combustion zone 20 as described with reference to FIG. 1. The staging fuel lances 6 are oriented radially around the burner assembly axis and lead to burner tile 4; each lance has a fuel nozzle 16 at the face of burner tile 4. The oxidant nozzles 17 are oriented radially around the burner assembly axis in the annular body between central oxidizing gas conduit 2 and outer gaseous oxidant pipe 3, so that in this embodiment oxidant nozzles 17 are located at a smaller radial distance from the burner assembly axis than fuel nozzle openings 16. As shown in FIG. 2, it is desirable to stagger the angular placement (i.e., the circumferential location) of the fuel nozzles and the gaseous oxidant nozzles. The directions of gas discharged from the oxidant nozzles may vary in manner similar to that described above for the fuel nozzles.

Two optional oxy-fuel flame stabilizers 19 and 19a may be installed in the lower half of the burner tile to provide flame stability during oxy-fuel firing. The oxidizing gas in the optional flame stabilizers is the same as the gaseous oxidant through the nozzles 17. This mode of oxygen-enriched operation may be described as oxy-fuel firing. The oxy-fuel flame stabilizers may be needed in full oxy-fuel firing mode (i.e., in which the oxidizing gas contains greater than 65 vol % oxygen) if the furnace temperature is below the auto-ignition temperature of the fuel. The central flame stabilizer typically would be used for air-fuel operations and during the transition period from air-fuel to oxy-fuel firing. Once oxy-fuel combustion is stabilized, the air-fuel central flame stabilizer may be turned off.

Figure 3:
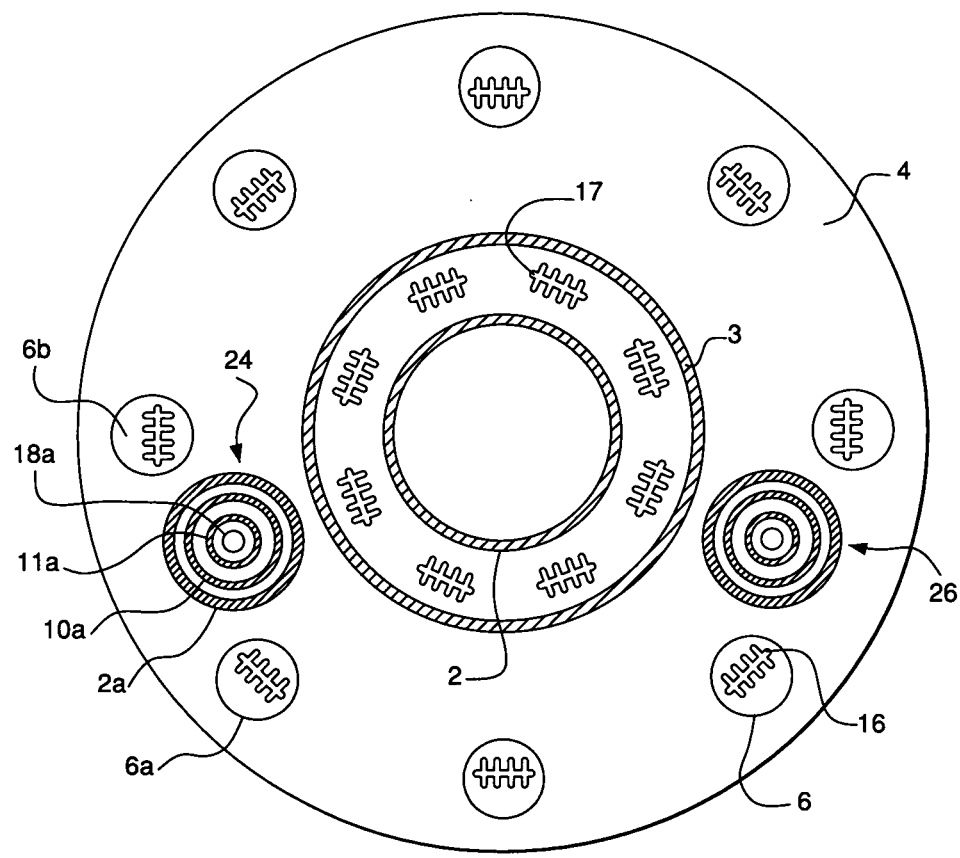
FIG. 3 is a front view of a burner assembly according to an alternative embodiment of the invention.

In an alternative embodiment of the invention, the central flame stabilizer is not used, and instead one or more small flame stabilizers 24 and 26 are installed in burner tile 4 as shown in FIG. 3. In this configuration, the central oxidizing gas conduit 2 is used as an unobstructed passage for introducing an oxygen-containing gas (air or oxygen-enriched air) into the combustion zone and for withdrawing combustion products from the combustion zone. This arrangement allows the burner assembly to be operated in a cyclic regenerative mode so that heat normally lost in the flue gas can be recovered and used to preheat the combustion air. Flame stabilizers 24 and 26 are utilized to ensure flame stability and may be placed at similar locations as the flame stabilizers 19 and 19a in FIG. 2. Flame stabilizer 24 has the same corresponding parts as the flame stabilizer in FIG. 1, namely, fuel lance 18a, inner oxidizing gas pipe 11a, fuel pipe 10a, and outer oxidizing gas conduit 2a. Flame stabilizer 26 likewise has the same corresponding parts. In this option, fuel lance 18a inside flame stabilizer 24 may be used during cold furnace startup; alternatively, the two fuel lances 6a and 6b closest to flame stabilizer 24 may be use for furnace start-up. Typically, the concentration of oxygen in the gaseous oxidant from the oxidant nozzles 17 is greater than that in the oxygen-enriched gas in conduit 2.

The cyclic operation of the burner assembly of FIG. 3 is carried out during alternating time periods of firing and exhaust. During a first time period (firing), oxidizing gas (air or oxygen-enriched air) is introduced through central oxidizing gas conduit 2 into the combustion zone, a gaseous oxidant containing greater than 65 vol % oxygen is introduced through one or more oxidant nozzles 17 into the combustion zone, fuel is introduced through one or more fuel nozzles 16 into the combustion zone, and the fuel is combusted to generate combustion products in the combustion zone. During a second time period (exhaust) following the first time period, the introduction of the fuel, oxidizing gas and the gaseous oxidant into the combustion zone are terminated, and at least a portion of the combustion products from the combustion zone are withdrawn through the central oxidizing gas conduit 2. A plurality of burner assemblies may be utilized such that during any time period some of the assemblies are operated in the firing mode and the remaining assemblies are operated in the exhaust mode.

Figure 4:
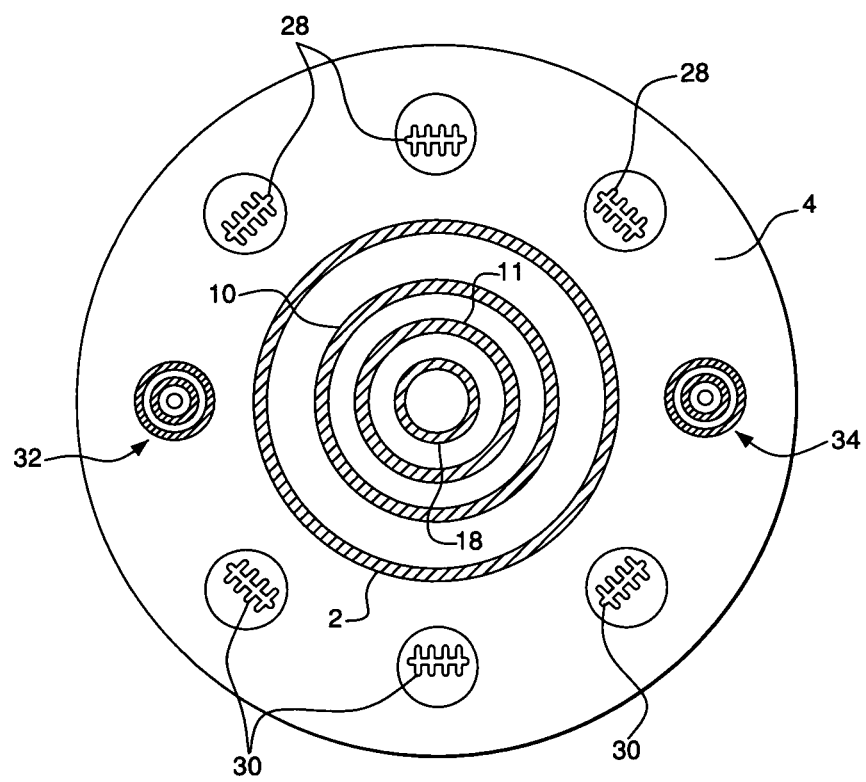
FIG. 4 is a front view of a burner assembly according to another alternative embodiment of the invention.

Another alternative embodiment of the invention is illustrated in FIG. 4 wherein the fuel and oxidant nozzles are located at the same radial distance from the burner assembly axis. This arrangement can reduce the overall size of the burner assembly when a low number of nozzles can be used. When the number of nozzles for both fuel and gaseous oxidant is less than the number shown in the embodiments of FIGS. 2 and 3, the gas exit velocities from the nozzles will be higher, which is beneficial to the entrainment of combustion products into the fuel and gaseous oxidant streams. In one version of this embodiment as shown in FIG. 4, gaseous oxidant nozzles 28 are installed in the upper half of burner tile 4 and fuel nozzles 30 are located in the lower half of burner tile 4. The central flame stabilizer comprising central oxidizing gas conduit 2 and pipes 10, 11, and 18 is similar to the embodiment of FIG. 2.

The configuration of the fuel and gaseous oxidant injection nozzles in FIG. 4 may be advantageous in a process such as secondary aluminum melting in which oxidative metal loss is a primary concern. When the burner assemblies are oriented to fire over the surface of the melting mass of metal, the fuel provides a blanketing layer that separates the oxygen in the gaseous oxidant from the metal and maintains a reducing atmosphere around the metal. In this configuration, the use of oxy-fuel flame stabilizers 32 and 34 is desirable. In another modified configuration, the fuel and oxygen nozzles may alternate around the circumference at the same radial distance from the burner axis. This modified configuration may provide better oxy-fuel flame stability in certain applications than that shown in FIG. 4, and flame stabilizers may not be required.

The exemplary burner assemblies illustrated in FIGS. 1-4 utilize geometries in which the fuel and oxidant nozzles are located in circular arrangements around the burner axis. In other embodiments, non-circular arrangements may be used in which the fuel nozzles are located at various radial distances from the burner axis and/or in which the oxidant nozzles are located at various radial distances from the burner axis. The burner face may have a square, rectangular, or other non-circular shape in which the fuel and/or oxidant nozzles are arranged about the axis in square, rectangular, or any other non-circular orientations.

Fluid-based or fluidic flame stabilizers as described above provide lower NOx formation than mechanical flame stabilizers that use bluff-body flame holders. Mechanical flame stabilizers are characterized by localized stagnant zones of fuel-rich combustion that are generally anchored at the inner base of the flame holder. These zones are located on the solid ridges between adjacent air openings due to pressure conditions created by the outer air stream. The fuel-rich or sub-stoichiometric mixtures that are needed at the flame holder base for flame stability unfortunately are ideal for the formation of —C≡N bonds through the reaction $CH.+N_2 \rightarrow HCN+N..$ Subsequent oxidation of HCN leads to flame holder-derived prompt NOx formation. Mechanical flame stabilizers also suffer from limited flame stability at extremely fuel-lean conditions which are desirable to control prompt NOx. In addition, mechanical flame stabilizers are susceptible to overheating or thermal oxidation due to high temperature flame anchoring, localized reducing atmosphere, and scaling on the holder base, and furnace radiation damage may occur if combustion air supply to the metallic parts is interrupted.

The overall equivalence ratio typically is in the range of 0.2 to 0.4 for most mechanical flame stabilizers wherein the equivalence ratio is defined as the ratio of the actual fuel/air ratio to the stoichiometric fuel/air ratio. Stoichiometric combustion occurs when all the oxygen is consumed in the reaction, and there is no molecular oxygen ($O_2$) in the products. If the equivalence ratio is equal to one, the combustion is stoichiometric A properly designed fluid-based flame stabilizer can circumvent all the above disadvantages. Useful types of fluid-based flame stabilizers are described, for example, in U.S. Pat. No. 6,752,620 B2, which is incorporated herein by reference. The mechanism of flame stabilization for these devices utilizes the creation of large scale vortices (LSV) between the fuel and the oxidizing gas within the flame stabilizer. This is explained with reference to FIG. 5, which is an enlarged axial section of the flame stabilizers described earlier with reference to FIGS. 2 and 4. The flame stabilizer comprises central oxidizing gas conduit 2, fuel pipe 10 recessed inside conduit 2, and secondary oxidizing gas pipe 11 recessed inside the fuel pipe 10. The outer diameters of central oxidizing gas conduit 2, secondary oxidizing gas pipe 11, and fuel pipe 10 are $D_{pa}$, $D_f$, and $D_{sa}$, respectively. The axial distance from the tip of central oxidizing gas conduit 2 and the tip of fuel pipe 10 is $L_f$ and the axial distance from the tip of fuel pipe 10 to the tip of secondary oxidizing gas pipe 11 is $L_{sa}$.

Figure 5:
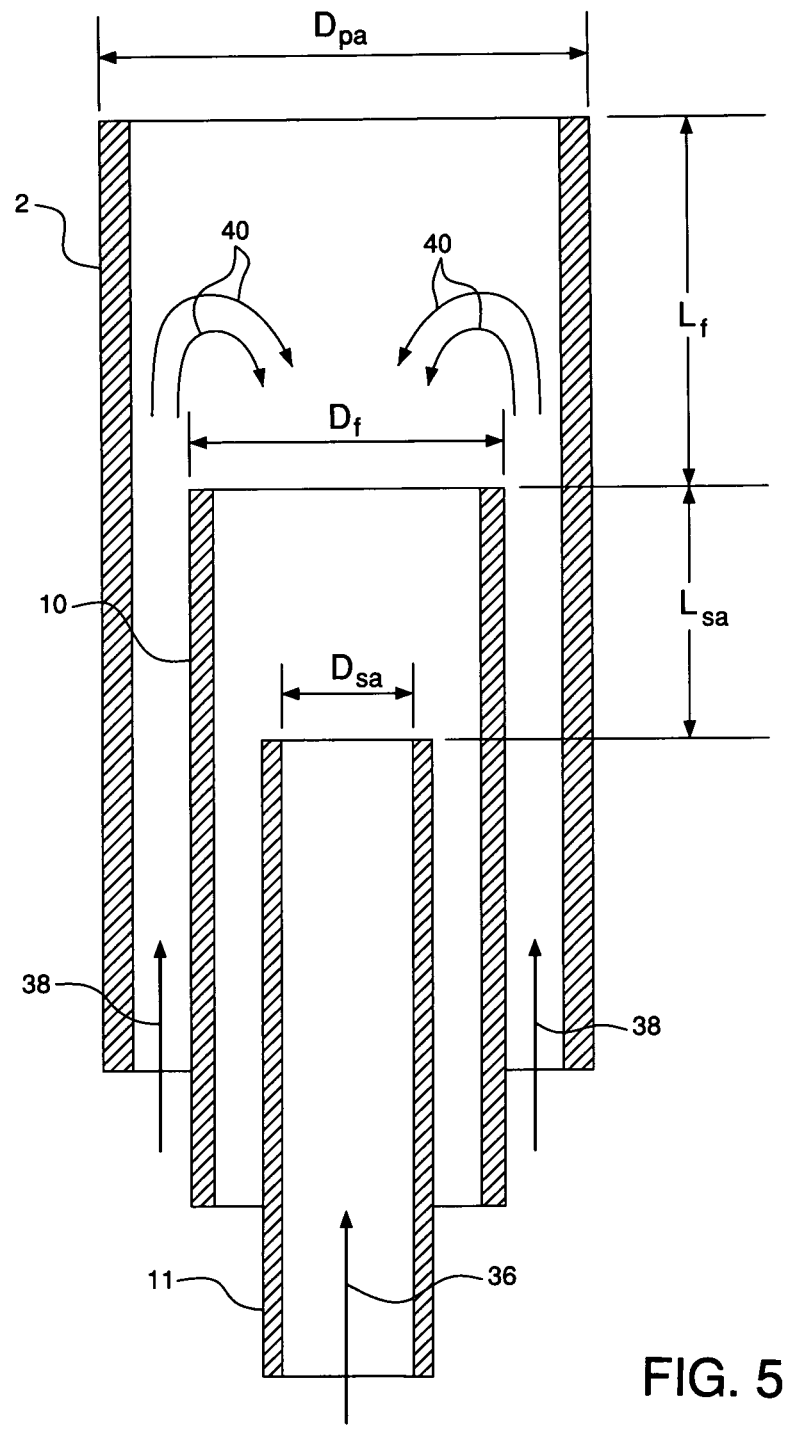
FIG. 5 is an axial section of a flame stabilizer used in various embodiments of the invention.

The primary oxidizing gas 38 (typically air) is introduced axially at relatively high velocity $V_{pa}$ in the annulus between central oxidizing gas conduit 2 and fuel pipe 10, while the secondary oxidizing gas 36 (typically air) is directed through the secondary oxidizing gas pipe 11 at a lower velocity $V_{sa}$ that is less than velocity $V_{pa}$. Due to the high velocity in the outer annulus and the much lower velocity in the center pipe, a pressure imbalance is developed around the center oxidizing gas jet. This causes stream-wise vortices 40 to develop downstream in the outer oxidizing gas pipe 2 as shown in FIG. 5 such that the flow direction of primary oxidizing gas 38 changes at least 90 degrees from the axial direction. The fuel velocity $V_f$ in the annulus between fuel pipe 10 and secondary oxidizing gas pipe 11 is generally lower than $V_{pa}$ and $V_{sa}$.

Table 1 gives specific velocity ranges and dimensionless ratios for obtaining stable stream-wise vortices 40 in primary oxidizing gas pipe 2. The preferred average velocity ranges for fuel is about 2 to 6 ft/sec, for primary oxidizing gas is 30 to 90 ft/sec, and for secondary oxidizing gas is 15 to 45 ft/sec.

TABLE 1

Velocity Ranges and Dimensionless Ratios for Flame Stabilizer of FIG. 5

| LSV Firing Rate (MM Btu/Hr) | Velocity Range (ft/sec) | | | Ratios | | |
|---|---|---|---|---|---|---|
| | $V_{pa}$ | $V_f$ | $V_{sa}$ | $L_f/D_f$ | $L_f/D_{pa}$ | $L_{sa}/D_{sa}$ |
| 0.25 to 5 | 30-90 | 2-6 | 15-45 | 1 to 3 | 1 to 3 | 1 to 3 |

The LSV flame stabilizer described above can provide a very fuel-lean flame at equivalence ratios as low as 0.05. At this ratio, the combustion oxidizing gas (e.g., air) flow is almost 20 times more than the theoretically required oxidizing gas (e.g., air) flow. The flame stability is maintained at high excess oxidizing gas (e.g., air) flow due to fluid flow reversal caused by stream-wise vortices 40, which in turn causes internal recirculation of combustion products from the combustion zone, provides preheating of the air/fuel mixture, and generates intense mixing of fuel, oxidizing gas (e.g., air), and combustion products to create ideal conditions for flame stability. The LSV flame anchors on the tip of fuel pipe 11. Under normal operation, most LSV internal components remain at temperatures of less than 1000° F. The operation of LSV flame stabilizers based on the stream-wise vortex principle makes them inherently more stable at lower firing rates and at extremely low equivalence ratios. This results in lower peak flame temperatures and reduces thermal NOx and/or prompt NOx formation. At low firing rates and extremely fuel-lean stoichiometry, a flame with extremely low peak temperatures (e.g., less than 1600° F.) is produced, and NOx emissions less than 2 to 3 ppmv are realized.

It is desirable to use fuel and gaseous oxidant nozzles that use openings having shapes with a high circumference-to-area ratio. The discharge openings of at least one of the one or more fuel nozzles and of at least one of the one or more gaseous oxidant nozzles of FIGS. 2, 3, and 4 are characterized by a shape factor, σ, that is greater than about 10, wherein σ is a dimensionless parameter defined as $$\sigma = P^2/2A$$

where P is the perimeter dimension of the nozzle discharge opening and A is the area of the nozzle discharge opening. The perimeter dimension is the dimension of the wetted edges of the discharge opening as measured at the plane of the nozzle face where the nozzle discharges into the combustion zone. The area of the discharge opening likewise is determined at the plane of the nozzle face where the nozzle discharges into the combustion zone.

Figure 6:
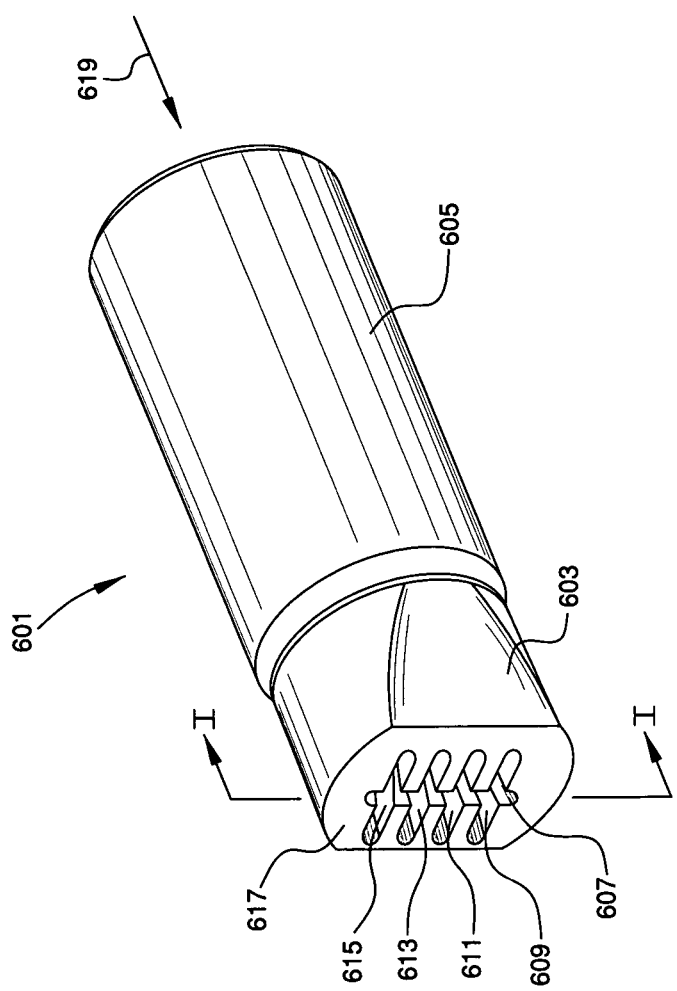
FIG. 6 is a perspective view of a nozzle assembly used in various embodiments of the invention.

The nozzle design should encourage intense entrainment of the surrounding combustion gas by the exiting jets of fuel and gaseous oxidant. Shapes and designs of nozzles suitable for use in the embodiments described above are described in U.S. Pat. No. 6,866,503 B2, which is incorporated herein by reference. One of these nozzle designs is illustrated in FIG. 6. Nozzle assembly 601 comprises nozzle body 603 joined to nozzle inlet pipe 605. Slot 607, illustrated here as vertically-oriented, is intersected by slots 609, 611, 613, and 615. The slots are disposed between outlet face 617 and an inlet face (not seen) at the connection between nozzle body 603 and nozzle inlet pipe 605. Gaseous oxidant 619 flows through nozzle inlet pipe 605 and through slots 607, 609, 611, 613, and 615, and then mixes with combustion products surrounding the slot outlets. The opening formed by slots 607, 609, 611, 613, and 615 forms the nozzle as earlier defined.

In addition to the slot pattern shown in FIG. 6, other slot patterns are possible as described later; the nozzle assembly can be used in any orientation and is not limited to the generally horizontal orientation shown. When viewed in a direction perpendicular to outlet face 617, exemplary slots 609, 611, 613, and 615 intersect slot 607 at right angles. Other angles of intersection are possible between exemplary slots 609, 611, 613, and 615 and slot 607. When viewed in a direction perpendicular to outlet face 617, exemplary slots 609, 611, 613, and 615 are parallel to one another; however, other embodiments are possible in which one or more of these slots are not parallel to the remaining slots.

The term "slot" as used herein is defined as an opening through a nozzle body or other solid material wherein any slot cross-section (i.e., a section perpendicular to the inlet flow axis defined below) is non-circular and is characterized by a major axis and a minor axis. The major axis is longer than the minor axis and the two axes are generally perpendicular. For example, the major cross-section axis of any slot in FIG. 6 extends between the two ends of the slot cross-section; the minor cross-section axis is perpendicular to the major axis and extends between the sides of the slot cross-section. The slot may have a cross-section of any non-circular shape and each cross-section may be characterized by a center point or centroid, where centroid has the usual geometric definition.

A slot may be further characterized by a slot axis defined as a straight line connecting the centroids of all slot cross-sections. In addition, a slot may be characterized or defined by a center plane which intersects the major cross-section axes of all slot cross-sections. Each slot cross-section may have perpendicular symmetry on either side of this center plane. The center plane extends beyond either end of the slot and may be used to define the slot orientation relative to the nozzle body inlet flow axis as described below.

Figure 7:
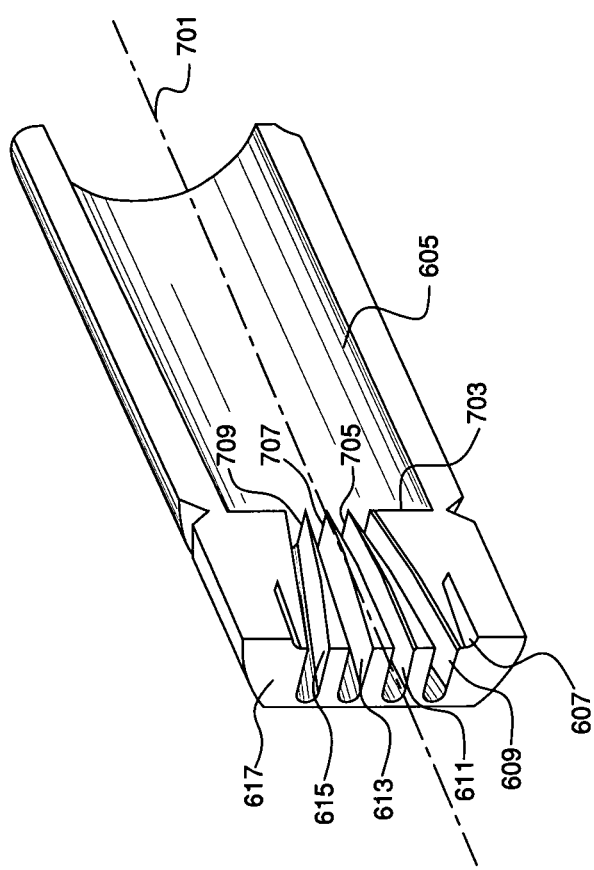
FIG. 7 is a perspective view of axial section I-I of the nozzle of FIG. 6.

Axial section I-I of the nozzle of FIG. 6 is given in FIG. 7. Inlet flow axis 701 passes through the center of nozzle inlet pipe 605, inlet face 703, and outlet face 617. In this embodiment, the center planes of slots 609, 611, 613, and 615 lie at angles to inlet flow axis 701 such that gaseous oxidant flows from the slots at outlet face 617 in diverging directions from inlet flow axis 701. The center plane of slot 607 (only a portion of this slot is seen in FIG. 7) also lies at an angle to inlet flow axis 701. As will be seen later, this exemplary feature directs gaseous oxidant from the nozzle outlet face in another diverging direction from inlet flow axis 701. In this exemplary embodiment, when viewed in a direction perpendicular to the axial section of FIG. 7, slots 609 and 611 intersect at inlet face 703 to form sharp edge 705, slots 611 and 613 intersect to form sharp edge 707, and slots 613 and 615 intersect to from sharp edge 709. These sharp edges provide aerodynamic flow separation to the slots and reduce pressure drop associated with bluff bodies. Alternatively, these slots may intersect at an axial location between inlet face 703 and outlet face 617, and the sharp edges would be formed within nozzle body 603. Alternatively, these slots may not intersect when viewed in a direction perpendicular to the axial section of FIG. 7, and no sharp edges would be formed.

The term "inlet flow axis" as used herein is an axis defined by the flow direction of fluid entering the nozzle at the inlet face, wherein this axis passes through the inlet and outlet faces. Typically, but not in all cases, the inlet flow axis is perpendicular to the center of nozzle inlet face 703 and/or outlet nozzle face 617, and meets the faces perpendicularly.

When nozzle inlet pipe 605 is a typical cylindrical conduit as shown, the inlet flow axis may be parallel to or coincident with the conduit axis.

The axial slot length is defined as the length of a slot between the nozzle inlet face and outlet face, for example, between inlet face 703 and outlet face 617 of FIG. 7. The slot height is defined as the perpendicular distance between the slot walls at the minor cross-section axis. The ratio of the axial slot length to the slot height may be between about 1 and about 20.

The multiple slots in a nozzle body may intersect in a plane perpendicular to the inlet flow axis. As shown in FIG. 6, for example, slots 609, 611, 613, and 615 intersect slot 607 at right angles. If desired, these slots may intersect in a plane perpendicular to the inlet flow axis at angles other than right angles. Adjacent slots also may intersect when viewed in a plane parallel to the inlet flow axis, i.e., the section plane of FIG. 7. As shown in FIG. 7, for example, slots 609 and 611 intersect at inlet face 703 to form sharp edge 705 as earlier described. The angular relationships among the center planes of the slots, and also between the center plane of each slot and the inlet flow axis, may be varied as desired. This allows gaseous oxidant to be discharged from the nozzle in any selected direction relative to the nozzle axis.

Additional views of exemplary nozzle body 603 are given in FIGS. 8A to 8D. FIG. 8A is a front perspective view of the nozzle body; FIG. 8B is a view of section II-II of FIG. 8A and illustrates the angles formed between the center planes of the slots and the inlet flow axis. Angle $\alpha_1$ is formed between the center plane of slot 615 and inlet flow axis 701 and angle $\alpha_2$ is formed between the center plane of slot 609 and inlet flow axis 701. Angles $\alpha_1$ and $\alpha_2$ may be the same or different, and may be in the range of 0 to about 30 degrees. Angle $\alpha_3$ is formed between the center plane of slot 611 and inlet flow axis 701 and angle $\alpha_4$ is formed between the center plane of slot 613 and inlet flow axis 701. Angles $\alpha_3$ and $\alpha_4$ may be the same or different, and may be in the range of 0 to about 30 degrees. The center planes of any two adjacent other slots may intersect at an included angle of between 0 and about 15 degrees.

FIG. 8C is a view of section III-III of FIG. 8A which illustrates the angle $\beta_1$ formed between the center plane of slot 607 and inlet flow axis 701. Angle $\beta_1$ may be in the range of 0 to about 30 degrees. The outer edges of slot 611 (as well as slots 609, 613, and 615) may be parallel to the center plane of slot 607.

FIG. 8D is a rear perspective drawing of the nozzle body of FIGS. 6 and 7 which gives another view of sharp edges 705, 707, and 709 formed by the intersections of slots 609, 611, 613, and 615.

Figure 9:
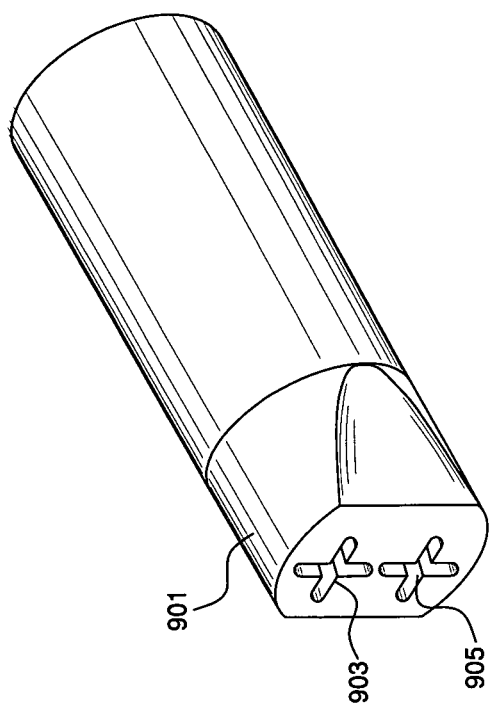
FIG. 9 is a perspective view of an alternative nozzle assembly used in various embodiments of the invention.

Another type of nozzle is illustrated in FIG. 9 in which the slots in nozzle body 901 are disposed in the form of two crosses 903 and 905. A front perspective view of the nozzle body is shown in FIG. 10A in which cross 903 is formed by slots 1007 and 1009 and cross 905 is formed by slots 1001 and 1013. A view of section IV-IV of FIG. 10A shown in FIG. 10B shows the center planes of slots 1009 and 1011 diverging from inlet flow axis 1015 by angles $\alpha_5$ and $\alpha_6$. Angles $\alpha_5$ and $\alpha_6$ may be the same or different and may be in the range of 0 to about 30 degrees. The outer edges of slot 1007 may be parallel to the center plane of slot 1009 and the outer edges of slot 1013 may be parallel to the center plane of slot 1011. In this embodiment, slots 1007 and 1011 intersect to form sharp edge 1012.

A view of section V-V of FIG. 10A is shown in FIG. 10C, which illustrates how the center plane of slot 1013 diverges from inlet flow axis 1015 by included angle $\beta_2$, which may be in the range of 0 to about 30 degrees. The outer edges of slot 1011 may be parallel to the center plane of slot 1013.

As described above, slots may intersect other slots in either or both of two configurations. First, slots may intersect when seen in a view perpendicular to the nozzle body outlet face (see, for example, FIG. 8A or 10A) or when seen in a slot cross-section (i.e., a section perpendicular to the inlet flow axis between the inlet face and outlet face). Second, adjacent slots may intersect when viewed in a section taken parallel to the inlet flow axis (see, for example, FIGS. 7, 8B, and 10B). An intersection of two slots occurs by definition when a plane tangent to a wall of a slot intersects a plane tangent to a wall of an adjacent slot such that the intersection of the two planes lies between the nozzle inlet face and outlet face, at the inlet face, and/or at the outlet face. For example, in FIG. 7, a plane tangent to a wall of slot 609 intersects a plane tangent to a wall of slot 607 and the intersection of the two planes lies between inlet face 703 and outlet face 617. A plane tangent to upper wall of slot 609 and a plane tangent to the lower wall of slot 611 intersect at edge 705 at inlet face 703. In another example, in FIG. 10B, a plane tangent to the upper wall of slot 1013 and a plane tangent to the lower wall of slot 1007 intersect at edge 1012 between the two faces of the nozzle.

Each of the slots in the exemplary embodiments described above has generally planar and parallel internal walls. Other embodiments are possible in which the planar walls of a slot may converge or diverge relative to one another in the direction of fluid flow. In other embodiments, the slot walls may be curved rather than planar. Each of the slots in the exemplary embodiments described above has a generally rectangular cross-section with straight sides and curved ends.

Both cross- and zipper-shaped nozzles described above provide improved performance compared to traditional circular nozzles in terms of overall NOx emissions; this improvement is directly related to improved furnace gas entrainment as a result of using these exemplary nozzle geometries. Table 2 gives typical ranges of the geometric design parameters for these nozzles which are useful to effect significant entrainment of combustion products into injected fuel and oxidant streams, which reduces NOx formation in the combustion process. The design parameters are defined in FIGS. 11 and 12.

TABLE 2

| Secondary Fuel Nozzle Type | (H) Slot Height, (inch) | (W) Slot Width, (inch) | ($R_o$/R1) Slot end radius to center radius ratio | (H/$R_o$) Slot height to corner radius ratio | ($\alpha$, $\alpha_1$, $\alpha_2$) Axial divergence angle, degrees | ($\beta$) Radial divergence angle, degrees |
|---|---|---|---|---|---|---|
| Cross Nozzle | (1/32-1) | (1/4-2) | (1-3) | (2-6) | (0-30) | (0-30) |

TABLE 2-continued

Figure 12:
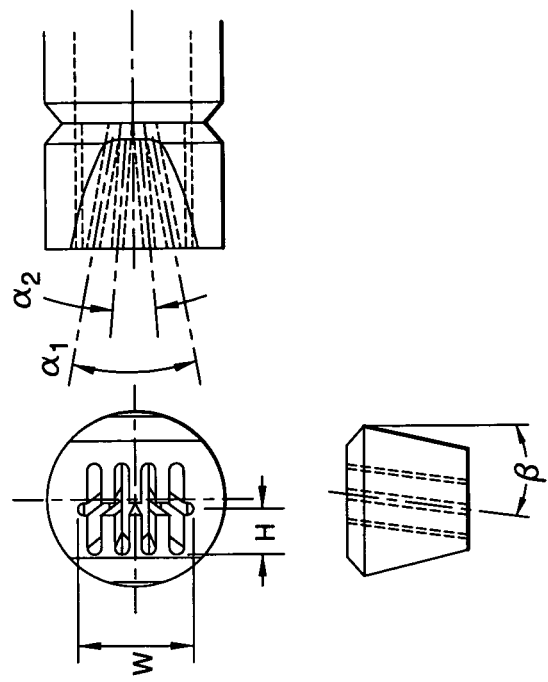
FIG. 12 presents definitions of various geometrical design parameters of the nozzle body of FIGS. 8A, 8B, and 8C.
Figure 11:
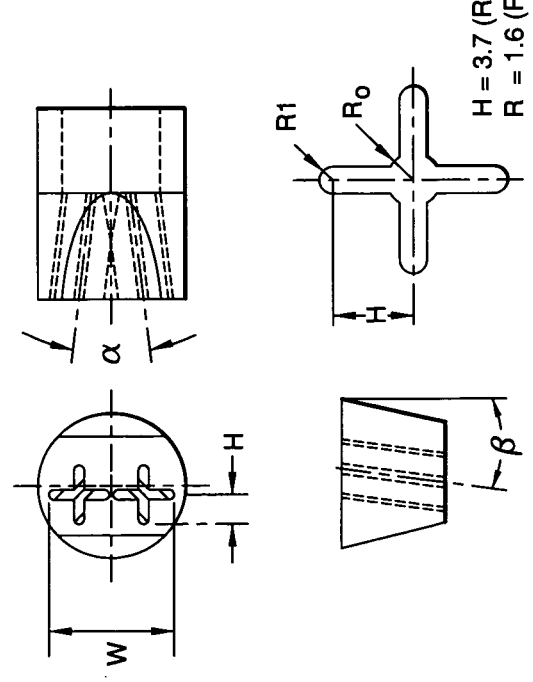
FIG. 11 presents definitions of various geometrical design parameters of the nozzle body of FIGS. 10A, 10B, and 10C.

Typical Ranges for Nozzle Design Parameters (FIGS. 11 and 12)

| Secondary Fuel Nozzle Type | (H) Slot Height, (inch) | (W) Slot Width, (inch) | $(R_o/R1)$ Slot end radius to center radius ratio | $(H/R_o)$ Slot height to corner radius ratio | $(\alpha, \alpha_1, \alpha_2)$ Axial divergence angle, degrees | $(\beta)$ Radial divergence angle, degrees |
|---|---|---|---|---|---|---|
| (FIG. 11) Zipper Nozzle (FIG. 12) | (1/32-1) | (1/4-2) | (1-3) | (2-6) | (0-30) | (0-30) |

The nozzles illustrated in FIGS. 6-12 preferably are characterized by a shape factor, σ, that is greater than about 10, wherein σ is the dimensionless parameter defined earlier as $$\sigma = P^2/2A$$

where P is the perimeter dimension of the nozzle discharge opening and A is the area of the nozzle discharge opening. The perimeter dimension is the dimension of the wetted edges of the discharge opening as measured at the plane of the nozzle face where the nozzle discharges into the combustion zone. The area of the discharge opening likewise is determined at the plane of the nozzle face where the nozzle discharges into the combustion zone.

Ultra-low NOx levels can be attained only by the sharp curtailment of both thermal NOx and prompt NOx formation. It is relatively easy to suppress thermal NOx formation by conventional techniques such as staged combustion and flue gas recirculation into the flame. However, these methods are not effective in reducing prompt NOx formation that occurs at the flame front. For example, the minimization of thermal NOx can bring the total NOx level down to about 50 ppmv for an air-fuel flame; to reach lower levels, prompt NOx formation must be reduced. This can be accomplished by spaceous or distributed combustion using the burner assemblies described above. Spaceous or distributed combustion, also known in the art as flameless combustion, occurs when the fuel and oxidizer are rapidly diluted prior to reacting in the furnace. Because of the high degree of dilution that occurs in spacious combustion, the formation of policyclic aromatic compounds is suppressed and prompt NOx formation is reduced significantly.

In air-fuel combustion, fuel dilution alone is sufficient to entrain 20%-30% of the furnace combustion products into the fuel-air mixture. For combustion with high purity oxygen, however, an entrained fluid volume roughly four times that of the oxygen flow volume is required. Therefore, both the fuel and oxygen-containing streams must be diluted by the furnace combustion products during enriched air and full oxy-fuel operations. This can be achieved effectively by using the burner assemblies and nozzle designs described above.

The embodiments of the invention thus include burner assemblies that can provide for the combustion of fuel with one or more oxygen-containing gases having oxygen concentrations in the range of 20.9 vol % (air) to greater than 99.5 vol % in high-purity commercially-available oxygen. The operation of these burner assemblies in stable spaceous combustion can yield ultra-low levels of flue gas NOx emissions below 20 ppmv in air-fuel firing and down to 0.01 lb $NO_2$ per MMBtu in oxy-fuel firing. Many design variations are possible depending on specific applications. For example, the systems of FIGS. 1-3 operate with fuel staged on the outermost ring of the burner. Such configurations are desirable for applications such as secondary aluminum melting in which oxidative metal loss is costly. By virtually shielding the oxidants with a layer of fuel (for example, natural gas), localized exposure of the metal to higly oxidizing environments can be reduced significantly. This is especially important for a bath of molten metal at a very high temperature that can be oxidized readily by contact with any oxidizing species.

In applications in which natural gas shielding is not required but in which low NOx generation is critical (such as, for example, steel reheating and ladle preheating), it is desirable to locate the fuel and oxygen nozzles such that the fuel is injected at locations between the oxygen and the air injection locations. Separating the two oxidizer streams by fuel streams will provide more robust low NOx emission performance during the enriched air firing mode. When oxygen and air are close in proximity, there is a chance of the two streams mixing to create an enriched oxidizer stream which is ideal for high NOx production due to the elevated flame temperature at higher oxygen content and the abundant nitrogen supply in the enriched air. As a matter of fact, NOx generation increases with oxygen content in the oxygen-containing gas up to about 50% $O_2$. It has been found that by physically separating the enriched air stream into two streams, one containing a higher oxygen concentration and the other a lower oxygen concentration, much lower NOx emission can be achieved while retaining the benefits of enriched air firing.

In addition to ultra-low NOx generation, the burners described above give a uniform heat release, which is highly desirable in all intended applications. This uniform heating is a result of spaceous combustion, which may be conceptualized as stretching a conventional flame zone into a much more distributed volume, thereby lowering the flame temperature and improving the spatial uniformity of heat transfer.

Various designs of the burner assemblies are possible as summarized below:
Flame stabilizer location: center or outside (FIGS. 2, 3, and 4)
Flame stabilizer type: air-fuel; oxy-fuel, nozzle-mix, or pre-mix pilot burners operating on gaseous or liquid fuel; fluid-based or bluff body-based stabilizers; and other energetic devices such as spark igniters or plasma guns
Fuel injection location: on the outermost radial location (FIGS. 2 and 3), at a radial location between the oxygen and air radial locations, at the same radial location as the oxygen and alternating with the oxygen locations, or at the same radial location as the oxygen but grouped (FIG. 4)
Operation: cold air, preheated air, or regenerative
Fuel type: gas, liquid, solid, or a mixture of thereof

EXAMPLE

A prototype burner was constructed having a general configuration as depicted in FIG. 4, except that nozzles were installed in place of flame stabilizers 32 and 34. The center of the burner has a fluid-based flame stablizer with the general configuration of FIG. 5. The nozzles are disposed around the central flame stabilizer at the same radius and are distributed evenly around the circumference at that radius for a total of 10 nozzles, 5 for fuel and 5 for oxygen. Fuel, natural gas (NG) in this case, and pure oxygen were introduced through alternate nozzles. Natural gas also was the fuel used in the flame stabilizer, and air was the oxidizing gas used in the central flame stabilizer. This burner therefore can be operated in the air-fuel firing mode when flows to the oxygen nozzles are turned off and in the oxy-fuel firing mode when the central flame stabilizer is turned off. The burner can be operated with an overall oxidant concentration anywhere between 20.9 vol % and greater than 99.5 vol % when oxygen flows through the oxygen nozzles and air is used in the central flame stabilizer.

In this example, the flame stabilizer in the center of the burner as depicted in FIG. 4 and FIG. 5 is made up of a 3 inch pipe for conduit 11, a 6 inch pipe for conduit 10, and an 8 inch pipe for conduit 2. Start-up lance 18 is a ¾" diameter tube. The fuel and oxygen nozzles 28 and 30 are located on a circle with a diameter of 18.5 inches in diameter. In this example, different nozzle exit areas and exit orientations were explored for both the fuel and gaseous oxidant to find the best burner performance as determined by the NOx emission level and overall heat transfer efficiency. Tests were performed at different levels of overall oxygen enrichment levels, i.e., different flow combinations of oxygen and air to produce overall concentrations of oxygen in the total oxidizer (in vol %) of 35%, 50%, 65%, 80%, and essentially 100%. Table 3 lists the test conditions in terms of nozzle selection for natural gas and oxygen, where a negative nozzle exit angle means the fluid exiting the nozzle intersects the flow axis of the central flame stabilizer and a positive nozzle exit angle means the fluid exiting the nozzle diverges from the flow axis of the central flame stabilizer.

TABLE 3

Nozzle Configurations Tested in the Prototype Burner
for Low Emission and High Heat Transfer Efficiency

|  | Test 1 | Test 2 | Test 3 | Test 4 |
| --- | --- | --- | --- | --- |
| NG nozzle angle, degrees | −4 | +4 | +7 | +4 |
| O$_2$ nozzle angle, degrees | −4 | +4 | +4 | +4 |
| NG exit velocity, ft/sec | 236 | 236 | 571 | 393 |
| O$_2$ exit velocity, ft/sec | 159-291 | 159-291 | 337-662 | 264-484 |

Figure 13:
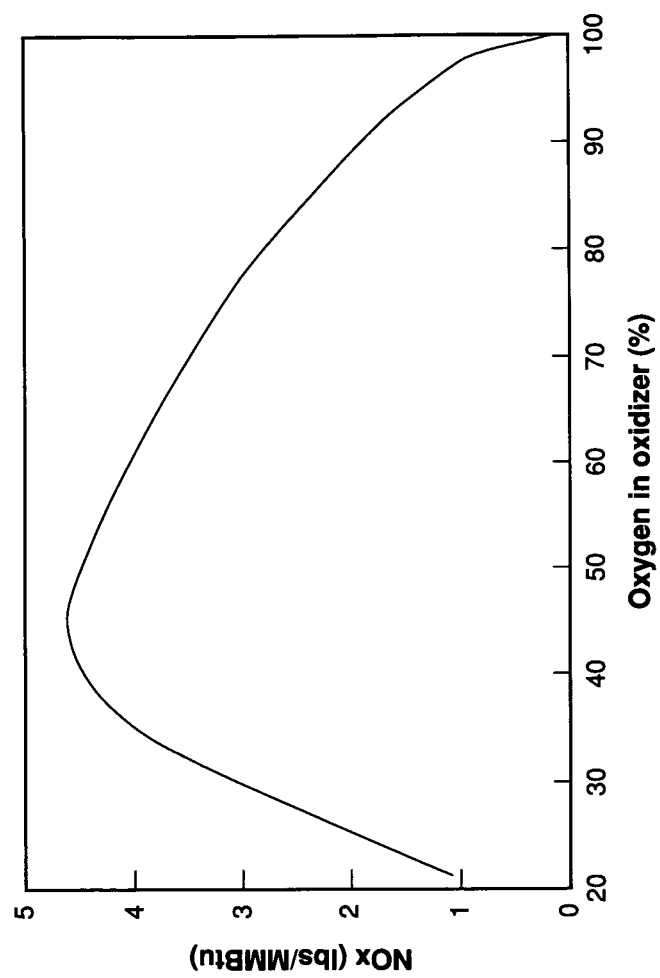
FIG. 13 a plot of NOx generation vs. % oxygen in the oxidizer for a typical combustion process.

Enriching the combustion air with oxygen usually is accompanied by a sharp increase in the level of NOx emission, which peaks at about 45% oxygen in the oxidizer before it starts to decrease. The NOx profile vs. the oxygen enrichment is a result of the competing effects of rising flame temperature and decreasing nitrogen availability as the oxidizer becomes more and more oxygen rich (see C. E. Baukal in "Oxygen-Enhanced Combustion", C. E. Baukal, ed., CRC Press, Boca Raton, 1998). This phenomenon is qualitatively depicted in FIG. 13, which is taken from that reference. NOx generation peaks in the oxygen concentration range of 40 vol % to 60 vol % in the oxidizer, but unfortunately this coincides with the oxygen concentration range which yields the optimum balance between the cost of oxygen and the process benefits of oxygen enrichment.

Figure 14:
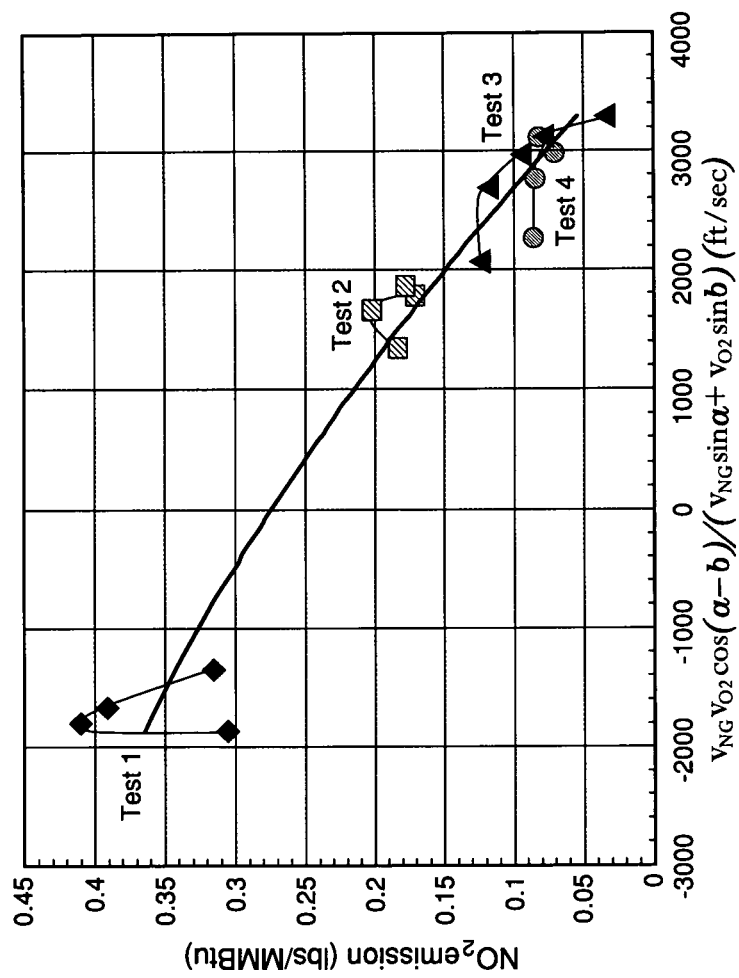
FIG. 14 is a plot of $NO_2$ emissions vs. geometric velocity for the Example, where geometric velocity is defined as $v_G = v_{NG} v_{O2} \cos(a-b)/(v_{NG} \sin a + v_{O2} \sin b)$.
Figure 15:
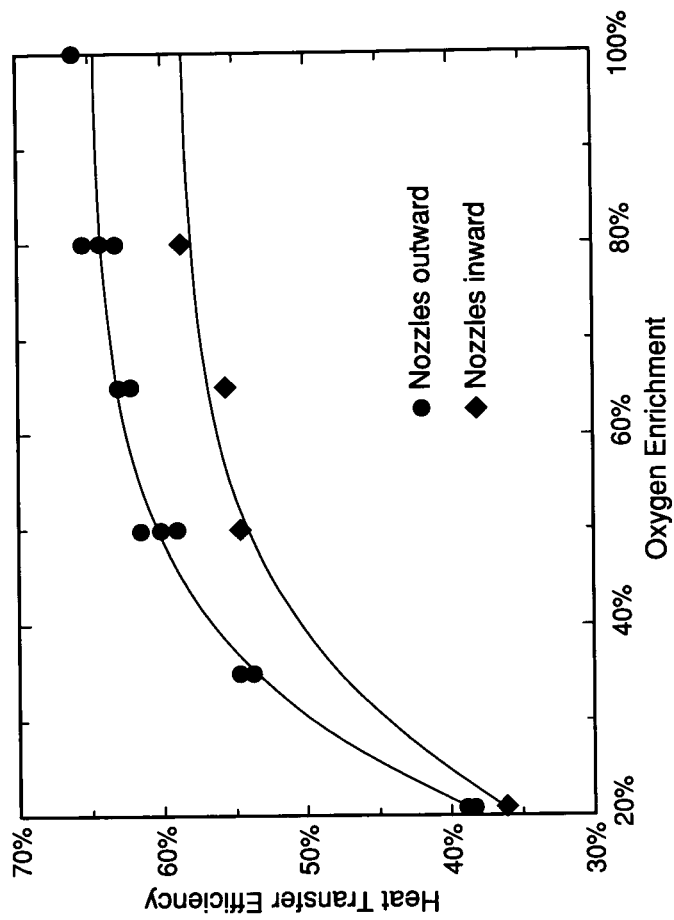
FIG. 15 is a plot of heat transfer efficiency vs. oxygen enrichment for the Example.

With proper nozzle design, the burner of this example can reduce NOx generation in the preferred operating range of 40%-60% oxygen concentration in the oxidizer. In order to evaluate data for all the different nozzle configurations together, a lumped parameter of the dimension of velocity is used to correlate with the NOx emission. The parameter, termed geometric velocity, $v_G$, is defined as $$v_G = v_{NG} v_{O2} \cos(a-b)/(v_{NG} \sin a + v_{O2} \sin b)$$

Where $v_{NG}$ and $v_{O2}$ are the natural gas and oxygen nozzle exit velocities in ft/sec and a and b are the natural gas and oxygen nozzle exit angles in degrees relative to the burner central axis, wherein the angle is negative for a converging angle and positive for a diverging angle. This parameter is used to quantify the alignment between the natural gas and oxygen jets and the orientations of the exiting jets. When the NOx emission is plotted against the geometric velocity as shown in FIG. 14, a revealing trend is seen. All the data can be correlated by a single curve which indicates that higher nozzle exit velocities lead to lower NOx emissions. Another observation is that the clusters of points represent experimental data with the same nozzle configuration but at different oxygen enrichment levels. The characteristic curve of NOx vs. oxygen enrichment is evident in each set of data. The magnitude of the NOx increase with enrichment, however, is far smaller than the extent of NOx reduction through careful nozzle selection on this burner. This implies that NOx increase with enrichment can be controlled readily with this burner design. In addition to higher exit velocity, this result also indicates that outward nozzle angles and fuel/oxygen jet alignment both help to reduce NOx formation. In addition to lowering NOx emission, outward nozzle angles also help improve fuel efficiency in a single-pass furnace design, which was the furnace design in which this burner was tested. FIG. 15 shows this result.

To illustrate the shape factor $\sigma = P^2/2A$ in real dimensions, consider one of the nozzles used in this example. The nozzle is a four-slot zipper nozzle as depicted in FIG. 6. The length of slot 607 is 0.824 in., while the lengths of the slots 609, 611, 613 and 615 are all 0.48 in. The half circle at the ends all the slots has a radius of 0.034 in. The center-to-center spacing between the four horizontal slots is 0.165 in., and the distance from the center of either of the two outermost horizontal slots to the closest end of the vertical slot also is 0.165 in. The wetted perimeter of such a nozzle opening is 4.78 in. and the area is 0.28 sq. in. The shape factor for such a nozzle is calculated to be about 40. These nozzles with highly tortuous perimeters have shown higher fluid entrainment rates experimentally as compared to simple nozzles having circular openings.

The invention claimed is:

1. A burner assembly comprising:
 (a) an elongated body having a periphery, a discharge end adjacent a combustion zone, and an axis, wherein the axis extends into the combustion zone;
 (b) a plurality of oxidant nozzles each characterized by a shape factor, $\sigma$, that is greater than about 10, the oxidant nozzles being disposed at the discharge end of the elongated body at a first radial distance from the axis and adapted to discharge a gaseous oxidant into the combustion zone;
 (c) a plurality of fuel nozzles each characterized by a shape factor, $\sigma$, that is greater than about 10, the fuel nozzles disposed at the discharge end of the elongated body at a second radial distance from the axis greater than or equal to the first radial distance and adapted to discharge a fuel into the combustion zone; and,
 (d) at least one of a fluid-based or fluidic flame stabilizer disposed within the periphery of the elongated body;

wherein σ=P²/2A, where P is the perimeter dimension of a discharge opening and A is the area of the discharge opening.

2. The burner assembly of claim 1 wherein the first radial distance is less than the second radial distance.

3. The burner assembly of claim 2 wherein the first radial distance is equal to the second radial distance.

4. The burner assembly of claim 3 wherein at least one of the fuel nozzles is disposed between two oxidant nozzles.

5. The burner assembly of claim 1 wherein the elongated body is divided by a horizontal plane containing the axis of the elongated body, wherein the number of oxidant nozzles disposed above the plane is greater than the number of oxidant nozzles disposed below the plane, and wherein the number of fuel nozzles disposed below the plane is greater than the number of fuel nozzles disposed above the plane.

6. The burner assembly of claim 5 wherein all oxidant nozzles are disposed above the plane and all fuel nozzles are disposed below the plane.

7. The burner assembly of claim 1 wherein the elongated body is divided by a horizontal plane containing the axis of the elongated body, wherein the number of oxidant nozzles disposed below the plane is greater than the number of oxidant nozzles disposed above the plane, and wherein the number of fuel nozzles disposed above the plane is greater than the number of fuel nozzles disposed below the plane.

8. The burner assembly of claim 1 comprising a passage disposed within the periphery of the elongated body and in flow communication with the combustion zone, wherein the passage is adapted to introduce an oxygen-containing gas into the combustion zone and to withdraw combustion products from the combustion zone.

9. The burner assembly of claim 8 wherein the passage is characterized by an axis that is parallel to or coincident with the axis of the elongated zone, and wherein the fuel and oxidant nozzles are spaced apart from the passage and disposed around the passage.

10. The burner assembly of claim 9 wherein a flame stabilizer is disposed within the passage and is characterized by an axis that is parallel to or coincident with the axis of the passage.

11. The burner assembly of claim 10 wherein a flame stabilizer is disposed between the passage and the periphery of the elongated body.

12. The burner assembly of claim 1 comprising an auxiliary burner disposed within the periphery of the elongated body and adapted to combust a fuel with an oxygen-containing gas and to discharge combustion products therefrom into the combustion zone.

13. The burner assembly of claim 12 wherein the auxiliary burner is disposed at a radial distance from the axis of the elongated body that is less than the radial distance or distances of the fuel and oxidant nozzles from the axis.

14. The burner assembly of claim 1 wherein at least one of the fuel nozzles is adapted to discharge fuel in a direction that intersects a plane containing the axis of the elongated body at an included angle of up to 45 degrees.

15. The burner assembly of claim 1 wherein at least one of the fuel nozzles is adapted to discharge fuel in a direction that diverges from a plane containing the axis of the elongated body at an included angle of up to 45 degrees.

16. The burner assembly of claim 1 wherein at least one of the oxidant nozzles is adapted to discharge the gaseous oxidant in a direction that intersects a plane containing the axis of the elongated body at an included angle of up to 45 degrees.

17. The burner assembly of claim 1 wherein at least one of the oxidant nozzles is adapted to discharge the gaseous oxidant in a direction that diverges from a plane containing the axis of the elongated body at an included angle of up to 45 degrees.

18. A burner assembly comprising:
(a) an elongated body having a periphery, a discharge end adjacent a combustion zone, and an axis, wherein the axis extends into the combustion zone;
(b) fuel nozzles each characterized by a shape factor, σ, that is greater than about 10, the fuel nozzles being disposed at the discharge end of the elongated body and oriented radially around the axis and adapted to discharge a fuel into the combustion zone;
(c) an auxiliary burner disposed within the elongated body and adapted to combust a fuel with an oxygen-containing gas and to discharge combustion products therefrom into the combustion zone; and
(d) oxygen nozzles each characterized by a shape factor, σ, that is greater than about 10, the oxygen nozzles being disposed at the discharge end of the elongated body and oriented radially around the axis and adapted to discharge an oxygen-containing gas into the combustion zone;
wherein σ=P²/2A, where P is the perimeter dimension of a discharge opening and A is the area of the discharge opening.

19. The burner assembly of claim 18 wherein the auxiliary burner is disposed at a radial distance from the axis of the elongated body that is less than the radial distances of the fuel nozzles from the axis.

20. A combustion method using a burner having an axis perpendicular to a combustion zone, comprising:
(a) flowing fuel and oxidant through a fluid-based or fluidic flame stabilizer such that the fuel and oxidant combust in the combustion zone;
(b) flowing oxidant through a plurality of oxidant nozzles into the combustion zone spaced apart from the burner axis by a first radial distance;
(c) flowing fuel through a plurality of fuel nozzles into the combustion zone spaced apart from the burner axis by a second radial distance greater than or equal to the first radial distance;
wherein each of the oxidant and fuel nozzles characterized by a shape factor, σ, that is greater than about 10, wherein σ is a dimensionless parameter defined as σ=P²/2A, where P is the perimeter dimension of the discharge opening and A is the area of the discharge opening; and
wherein the fuel flowed through the fuel nozzles is combusted in the combustion zone with the oxidant flowed through the oxidant nozzles.

21. The combustion method of claim 20 wherein the gaseous oxidant contains greater than 20.9 vol % oxygen.

22. The combustion method of claim 20 wherein the fuel is discharged through at least one of the fuel nozzles in a direction that intersects a plane containing the axis of the elongated body.

23. The combustion method of claim 20 wherein the fuel is discharged through at least one of the fuel nozzles in a direction that does not intersect a plane containing the axis of the elongated body.

24. The combustion method of claim 20 wherein the flame stabilizer is adapted to combust a flame stabilizer fuel with one or more oxidizing gases to form combustion products and to discharge the combustion products into the combustion zone, combusting the flame stabilizer fuel with one or more oxidizing gases to form combustion products, and discharging the combustion products into the combustion zone.

25. The combustion method of claim 24 wherein the concentration of oxygen in the gaseous oxidant is greater than the concentration of oxygen in the one or more oxidizing gases.

26. The burner assembly of claim 1 wherein the flame stabilizer comprises a fuel pipe recessed inside an oxidizing gas conduit.

27. The burner assembly of claim 1 wherein the flame stabilizer is supplied with fuel and oxidant.

28. The burner assembly of claim 18 further comprising at least one fluid-based or fluidic flame stabilizer disposed within the periphery of the elongated body.

29. The burner assembly of claim 28 wherein the flame stabilizer is adapted to combust a flame stabilizer fuel with one or more oxidizing gases to form combustion products and to discharge the combustion products into the combustion zone.

30. The burner assembly of claim 29 having a flame stabilizer characterized by a flame stabilizer axis, wherein the flame stabilizer axis is coaxial with the axis of the elongated body.

* * * * *